United States Patent
Beheshti et al.

[19]

[11] Patent Number: 5,955,946
[45] Date of Patent: Sep. 21, 1999

[54] ALARM/FACILITY MANAGEMENT UNIT

[76] Inventors: Ali Beheshti, 2020 Beacon Pl., Reston; Sam S. Zamani, 21313 Traskwood Ct., Sterling, both of Va. 20165

[21] Appl. No.: 09/019,929

[22] Filed: Feb. 6, 1998

[51] Int. Cl.⁶ .................................................. G08B 29/00
[52] U.S. Cl. ...................... 340/506; 340/517; 340/521; 340/825.06
[58] Field of Search ................... 340/500, 309.4, 340/318, 870.11, 825.01, 825.06, 505, 506, 518, 523, 521, 517

[56] References Cited

U.S. PATENT DOCUMENTS

| | | | |
|---|---|---|---|
| 4,538,138 | 8/1985 | Harvey et al. | 340/521 |
| 4,823,290 | 4/1989 | Fasack et al. | 340/825.01 |
| 5,367,670 | 11/1994 | Ward et al. | 395/575 |
| 5,416,725 | 5/1995 | Pacheco et al. | 340/825.06 |
| 5,428,555 | 6/1995 | Starkey et al. | 340/309.4 |
| 5,508,941 | 4/1996 | Leplingard et al. | 395/200.54 |
| 5,559,958 | 9/1996 | Farand et al. | 395/183.03 |
| 5,566,339 | 10/1996 | Perholtz et al. | 395/750.08 |
| 5,572,195 | 11/1996 | Heller et al. | 340/825.35 |
| 5,581,478 | 12/1996 | Cruse et al. | 364/528.11 |
| 5,623,357 | 4/1997 | Kight et al. | 359/135 |
| 5,648,966 | 7/1997 | Kondo et al. | 370/245 |

FOREIGN PATENT DOCUMENTS

| | | |
|---|---|---|
| 481880 | 4/1992 | European Pat. Off. . |
| 2128388 | 4/1984 | United Kingdom . |

*Primary Examiner*—Jeffery A. Hofsass
*Assistant Examiner*—Van T. Trieu
*Attorney, Agent, or Firm*—Richard C. Litman

[57] ABSTRACT

An alarm/facility management unit including a housing having a front side and a rear side. The front side includes a liquid crystal display for displaying two lines of up to twenty alphanumeric characters. The front side also includes four control keys which enable a user to access a software program contained within the alarm/facility management unit and perform a number of functions through the program. The front side of the alarm/facility management unit also includes a serial port for enabling communications with a personal computer. The rear side of the alarm/facility management unit includes at least two slots which can receive alarm/facility contact input cards, contact output cards, or serial port expansion cards. These slots can receive alarm/facility cards that provide real-time alarm/facility status on up to sixteen discrete alarm/facility contact inputs. The alarm/facility management unit is scalable from 16 to 128 discrete alarm/facility contact inputs.

20 Claims, 20 Drawing Sheets

SNMP Setup

System | Community | Alarm | Relay | Sensor

Sensor
- ☐ Temperature (C)
- ☐ Relative Humidity (%)

Sensor
Selection: Temperature (C)
Warning Low: 22
Warning High: 100
Danger Low: 21
Danger High: 100
Rate of Change: 1

Notification
Type: 6000 ticks

OK | Cancel | Apply | Help

40

ALARM/FACILITY MANAGEMENT UNIT

BACKGROUND OF THE INVENTION

1. Field of the Invention

The present invention relates generally to an alarm/facility management unit and, more particularly, to an end-to-end network management solution for remote, real-time monitoring of network components.

2. Description of the Related Art

A network generally includes a number of devices connected to allow inter-device communication. As networks and networked devices become increasingly complex, it becomes critically important to be able to monitor the status and performance of networks, and more particularly, to monitor the status and performance of each of the devices on the network. Consequently, most networks include at least one computer workstation responsible for monitoring the network.

Numerous network management station applications have been developed which allow network management stations to monitor one or more particular aspects of a network. The Simple Network Management Protocol (SNMP) was designed in the mid-1980's as an answer to the communication problems between different types of networks. Its initial aim was to be a "band-aid" solution until a better designed and more complete network manager became available. However, no better choice became available and SNMP evolved as the de facto Network Management Systems (NMS) protocol for resolving the problems associated with managing a multi-vendor network.

Implicit in the SNMP architecture is a collection of network elements and a Network Operations Center (NOC). The NOC executes management applications which monitor and control network elements. Network elements are devices such as radios, multiplexers, switches, hubs, PBXs, etc. SNMP is currently used and supported by most Open System based network devices. There remains a need for network management automated systems that can monitor, capture, communicate, interpret, and initiate action. Network managers want to have the ability to monitor and actively control each and every element of the entire network.

Additional related art is represented by the following patents of interest.

U.S. Pat. No. 4,823,290, issued on Apr. 18, 1989 to Martin L. Fasack et al., describes a method and apparatus for automatically monitoring the operating environment and other physical conditions around and in which a host computer system for local area networks. Fasack et al. do not suggest an alarm/facility management unit according to the claimed invention.

U.S. Pat. No. 5,508,941, issued on Apr. 16, 1996 to Bruno Leplingard et al., describes a network with surveillance sensors and a diagnostic system comprising equipments for conveying signals of utility to network users, sensors for supplying data on the operation of the network and a diagnostic system processing the data to establish diagnostics identifying causes of degraded operation, in which network the diagnostic system comprises a diagnostic evaluation subsystem for requesting secondary data if a diagnostic previously established is insufficient. Leplingard et al. do not suggest an alarm/facility management unit according to the claimed invention.

U.S. Pat. No. 5,566,339, issued on Oct. 15, 1996 to Ronald J. Perholtz et al., describes a microprocessor based unit designed to monitor the environment and control microprocessor based computers to which the unit is connected. Perholtz et al. do not suggest an alarm/facility management unit according to the claimed invention.

U.S. Pat. No. 5,572,195, issued on Nov. 5, 1996 to Alan C. Heller et al., describes an object tracking and location system using a network that implements object identifier variables. Heller et al. do not suggest an alarm/facility management unit according to the claimed invention.

U.S. Pat. No. 5,581,478, issued on Dec. 3, 1996 to Michael Cruse et al., describes a facility environment control system and method that is operable to communicate using an open network management protocol. Cruse et al. do not suggest an alarm/facility management unit according to the claimed invention.

U.S. Pat. No. 5,623,357, issued on Apr. 22, 1997 to William D. Kight et al., describes a means of interconnecting synchronous optical network segments while maintaining control over the network management information that passes through the interface. Kight et al. do not suggest an alarm/facility management unit according to the claimed invention.

U.S. Pat. No. 5,648,966, issued on Jul. 15, 1997 to Kenji Kondo et al., describes a method of improving network operation efficiency by providing a dedicated alarm/facility path in a wide area network. Kondo et al. do not suggest an alarm/facility management unit according to the claimed invention.

Europe Patent document 0 481 880 A1, published on Apr. 22, 1992, describes a security arrangement that utilizes identification cards and card readers that transmit data to a surveillance center. Europe '880 does not suggest an alarm/facility management unit according to the claimed invention.

Great Britain Patent document 2,138,388 A, published on Apr. 26, 1984, describes a telecontrol system with at least one master station and a plurality of substations connected to the master station via data transmission units. Great Britain '388 does not suggest an alarm/facility management unit according to the claimed invention.

A variety of companies, such as Westronics, MicroFrame, Applied Innovation, etc., manufacture products that are somewhat similar to the present invention. However, none are known to provide an embedded SNMP agent, end-to-end management capabilities, up to 128 discrete alarm/facility contact closures, primary and backup communication methods via Ethernet and internal modem, multiple serial ports, and an integrated network management application software, all in one product.

None of the above inventions and patents, taken either singularly or in combination, is seen to describe the instant invention as claimed.

SUMMARY OF THE INVENTION

The present invention is an alarm/facility management unit (AMU) which can monitor the health of a communications facility, provide port concentration, enhance security monitoring capabilities, and conduct remote site control functions. From a central location (i.e. a Network Operations Center (NOC)), the alarm/facility management unit allows one to monitor and manage any number of facilities. Through integration of a unique software program with a Hewlett Packard software program named OpenView™, the alarm/facility management unit provides powerful reporting and analysis capabilities. The network element monitoring and management support provides a combination of alarm/facility monitoring and fault management in a single device.

The alarm/facility management unit includes a housing having a front side and a rear side. The front side includes a liquid crystal display (LCD) for displaying two lines of up to twenty alphanumeric characters. The front side also includes four control keys which enable a user to access a software program contained within the alarm/facility management unit and perform a number of functions through the program. The front side of the alarm/facility management unit also includes a serial port enabling communications with a personal computer.

One embodiment of the rear side of the alarm/facility management unit includes ten slots which can receive contact input and contact output cards. Up to eight of the ten slots are capable of receiving contact input cards that provide real-time status on up to sixteen discrete contact closures per card. Up to two of the ten slots are capable of receiving contact output cards for issuing output signals to eight or sixteen discrete alarm/facility contact closures. The contact output cards provide eight contact outputs per card. The contact output cards provide the ability to control contact closures such as switches that control the power to equipment such as air conditioners, heaters, humidifiers, etc. The contact closures can be controlled remotely by an operator at the NOC, or a user can control these relays locally from the front panel LCD display and the control keys on the front of the alarm/facility management unit. From the NOC, a user can issue a standard SNMP SET command through the alarm/facility management unit to turn on a fan, for instance. The alarm/facility management unit can automatically determine whether a contact input card or a contact output card has been inserted and can properly communicate with the card. This embodiment also includes a DB-9P/RS-232 port for providing serial communications to an NOC, an RJ-45 connector for a 10Base-T Ethernet connection, an internal modem and two RJ-11 jacks for primary and secondary dial-up connectivity, a fuse holder, and a primary power input point for receiving input power.

A second embodiment of the rear side of the alarm/facility management unit includes sixteen slots which can receive up to six functionally specific cards, up to eight contact input cards, and up to two contact output cards. As in the first alarm/facility management unit embodiment, up to eight of the sixteen slots are capable of receiving contact input cards that provide real-time status on up to sixteen discrete contact closures per card, and up to two of the sixteen slots are capable of receiving contact output cards for issuing output signals to eight or sixteen discrete alarm/facility contact closures. The contact output cards provide eight contact outputs per card. The contact output cards provide the ability to control contact closures such as switches in the same manner as described above for the first embodiment. The alarm/facility management unit can automatically determine whether a contact input card or a contact output card has been inserted and can properly communicate with the card.

The alarm/facility management unit is equipped with a variety of hardware components. Major known electrical components are mounted within the alarm/facility management unit. Such components include a printed circuit board mounted in firm support within the alarm/facility management unit. The circuit board carries certain coupling and driver electronics with a microprocessor, Flash or Flash-disk memories and random access memories. In general, the Flash or Flash-disk memories are used to contain instructions and programs while the random access memories are employed for operating and working data. Of course, movement and process of instructions as well as data is controlled and accomplished by the microprocessor. The microprocessor is connected to all the keys on the front of the alarm/facility management unit and is variously connected to the other elements of the alarm/facility management unit. The memories are connected to the microprocessor through several signal paths. The alarm/facility management unit is powered from an alternating current source and includes a back-up battery for providing power when power from the alternating current source is disrupted.

The alarm/facility management unit takes a variety of alarm/facility inputs, including alarm/facility contact closures (form C, dry contacts), analog inputs, serial inputs, and converts them to standard SNMP messages which can then be viewed by any SNMP management platform. Users can configure the alarm/facility management unit to monitor up to 128 individual alarm/facility points (IP) with one unit. Alarm/facility input types include serial port cards for inputs from external devices that use serial protocols, analog input cards, and pulse based input cards. The alarm/facility management unit automatically issues a power failure alarm to warn network operators of a potentially critical power failure situation. In the event of a power failure, the alarm/facility management unit immediately switches to back-up battery which provides full functionality, including alarm notification to the NOC. The alarm/facility management unit remains operational for about twenty minutes after primary power failure. The alarm/facility management unit switches back to the main power supply when it comes back.

The alarm/facility management unit also serves the function of monitoring environmental conditions in remote locations, and reporting that information to an NOC. The alarm/facility management unit includes two environmental sensors for continuously monitoring temperature and relative humidity to determine if conditions are within pre-set thresholds. Warning and alarm conditions determined by the user are immediately reported to the NOC. The alarm/facility management unit can monitor high and low warning settings as well as high and low danger settings. The purpose of the warning messages is so that an alarm/facility can be sent to the NOC before the maximum and minimum danger thresholds are reached. In addition to the static environmentals, the alarm/facility management unit has the ability to detect the rate of change for any one or both of these environmental measurements. If, for example, the temperature in a remote location rises more quickly than some predetermined criteria, a warning or danger SNMP trap is immediately sent to the NOC for further investigation or for some corrective action to be taken.

Accordingly, it is a principal object of the invention to provide an alarm/facility management unit that provides a combination of alarm/facility monitoring and fault management in a single device.

It is another object of the invention to provide an alarm/facility management unit with a unique software program that provides powerful reporting and analysis capabilities.

It is an object of the invention to provide improved elements and arrangements thereof in an alarm/facility management unit for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is the System menu of the SNMP Setup Screen of the software program according to the invention.

FIG. 5 is the Alarm menu of the SNMP Setup Screen.

FIG. 7 is the Sensor menu of the SNMP Setup screen.

Similar reference characters denote corresponding features consistently throughout the attached drawings.

DETAILED DESCRIPTION OF THE PREFERRED EMBODIMENTS

Figure 1:
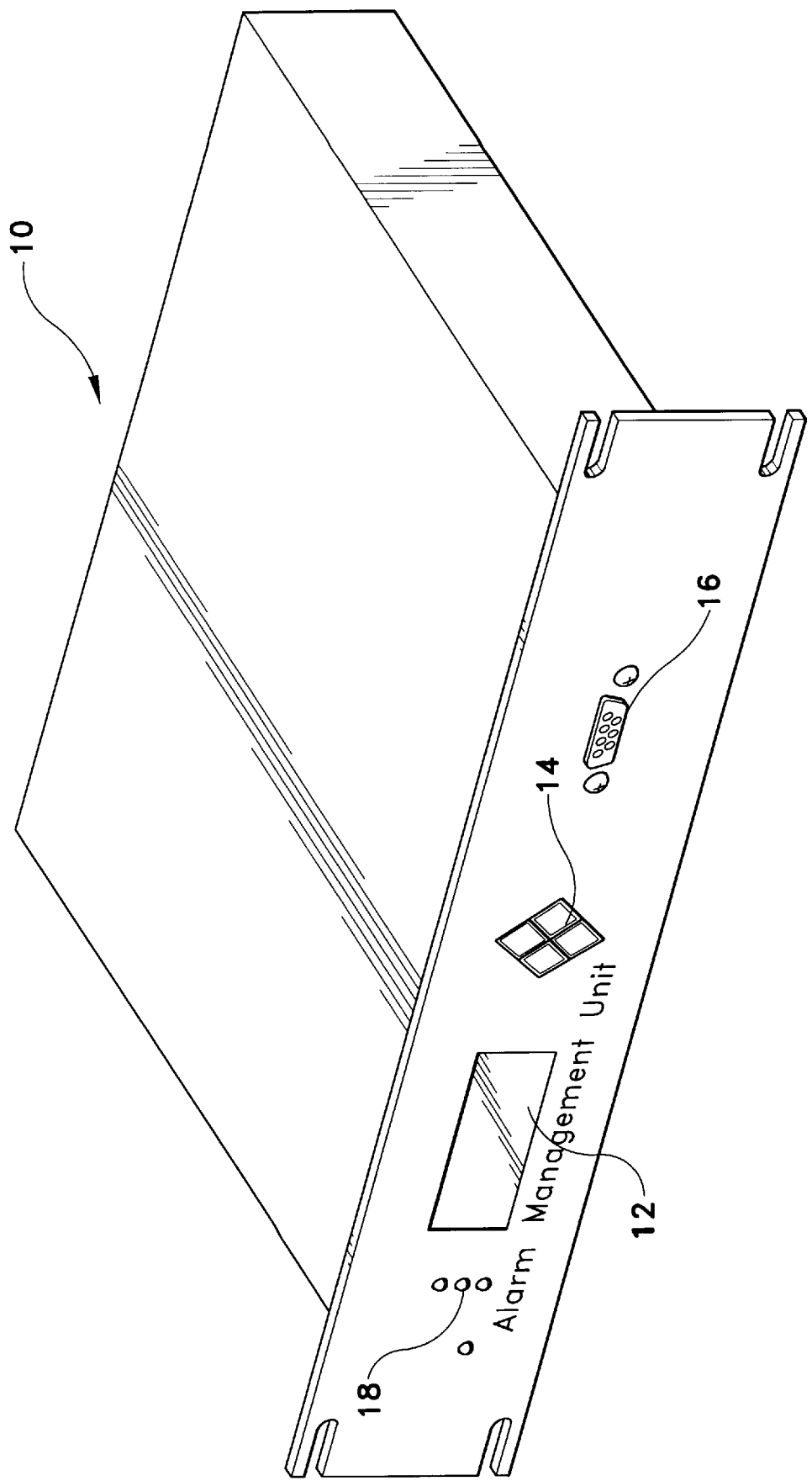
FIG. 1 is a front perspective view of an alarm/facility management unit according to the present invention.

The present invention is an alarm/facility management unit referenced generally by reference numeral 10 in FIG. 1. The alarm/facility management unit 10 can monitor the health of a communications facility, provide port concentration, enhance security monitoring capabilities, and conduct remote site control functions. From a central location (i.e. a Network Operations Center (NOC)), the alarm/facility management unit 10 allows one to monitor and manage any number of facilities. The alarm/facility management unit 10 includes a housing having a front side and a rear side. As shown in FIG. 1, the front side includes an LCD display 12 for displaying two lines of up to twenty alphanumeric characters. The front side also includes four control keys 14 which enable a user to access a software program contained within the alarm/facility management unit 10 and perform a number of functions through the program. The front side of the alarm/facility management unit 10 also includes a serial port 16 enabling communications with a personal computer.

Figure 2A:
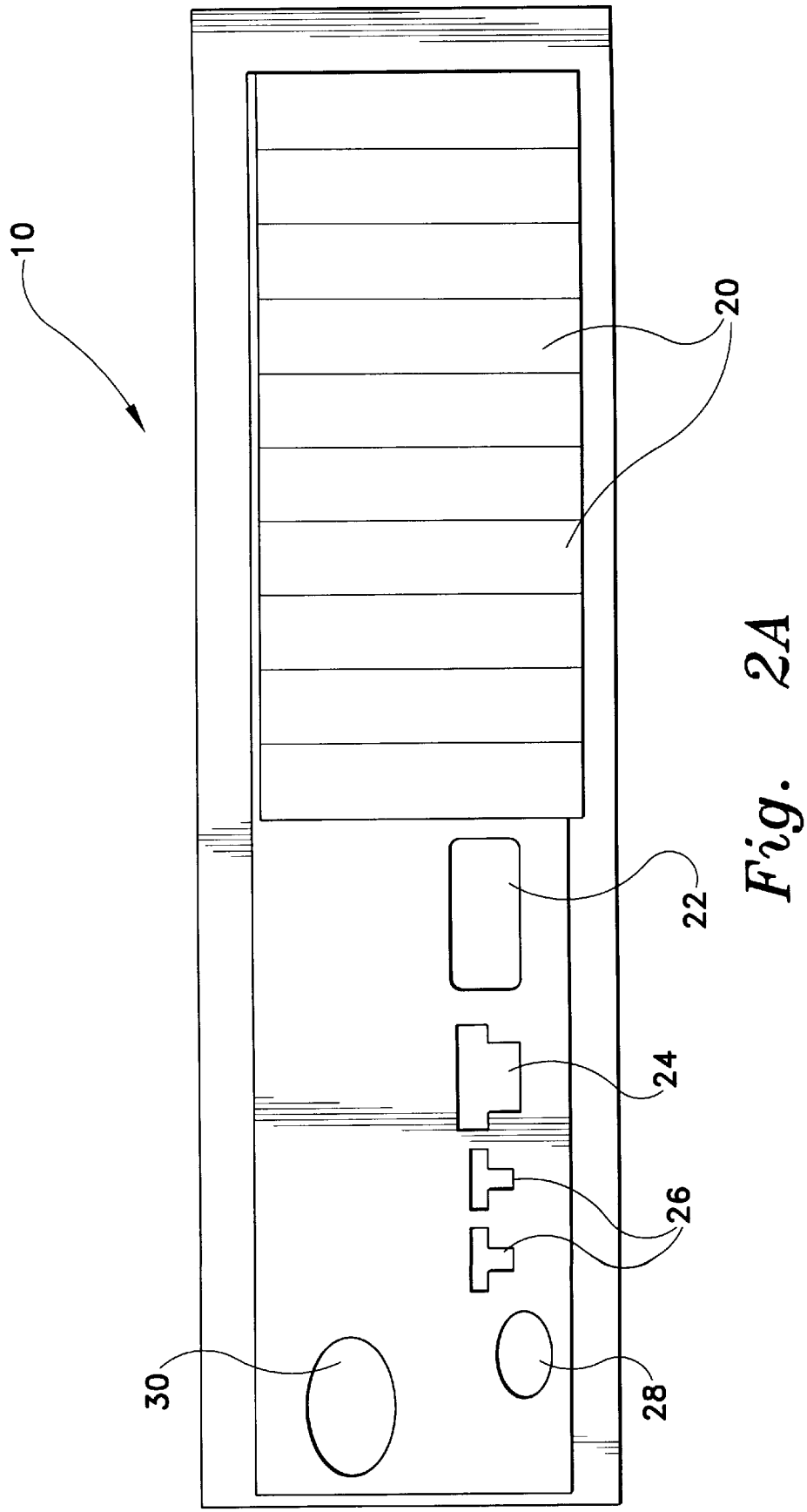
FIG. 2A is a first embodiment of a rear view of the alarm/facility management unit.
Figure 2B:
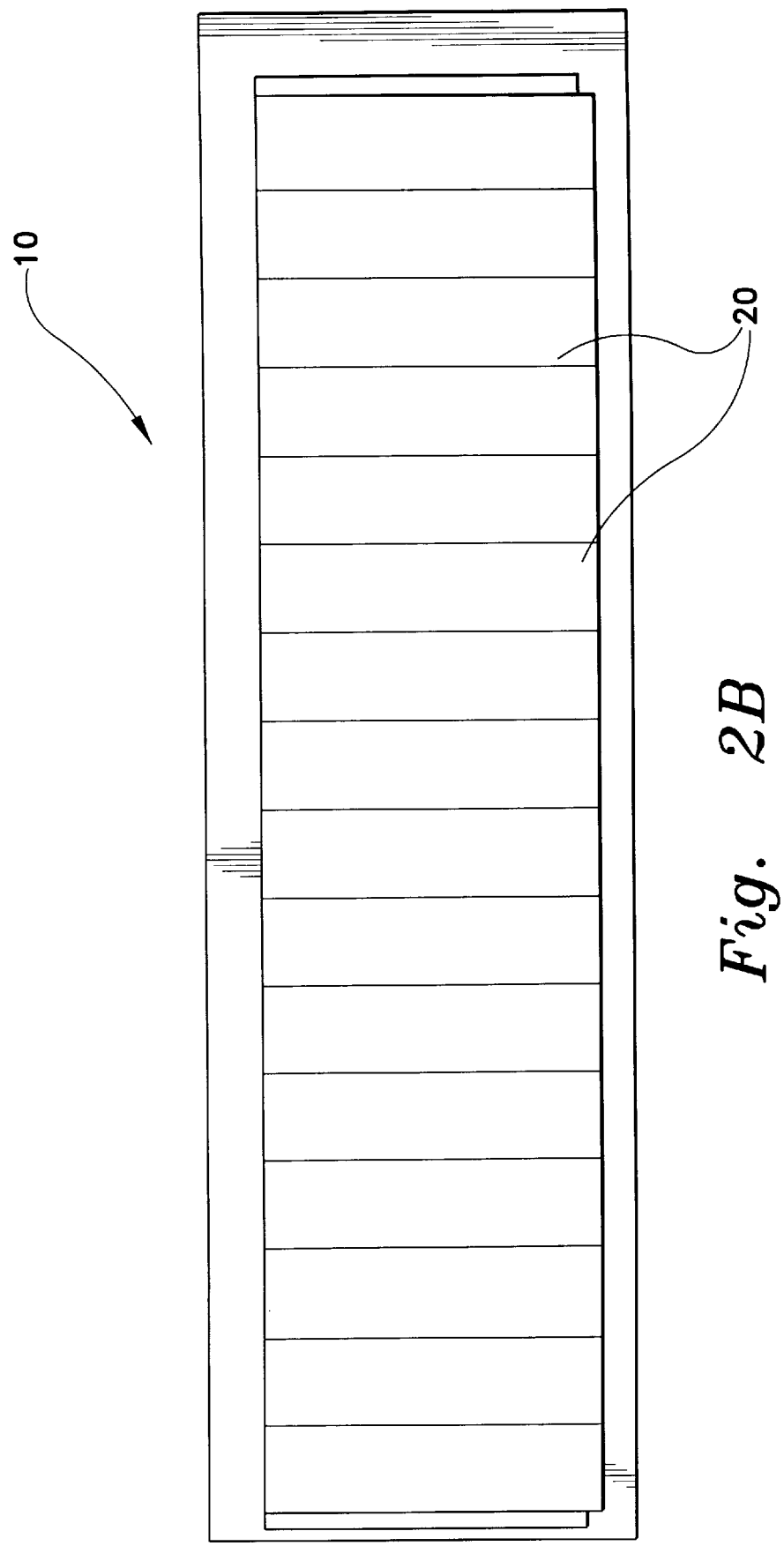
FIG. 2B is a second embodiment of a rear view of the alarm/facility management unit.

Two embodiments of the rear side of the alarm/facility management unit 10 are shown in FIGS. 2A and 2B. The embodiment shown in FIG. 2A includes ten slots 20 which can receive contact input and contact output cards. The contact input cards and the contact output cards can be removed and replaced from the alarm/facility management unit 10 in a power on condition (hot-swapping). Up to eight of the ten slots 20 are capable of receiving contact input cards that provide real-time status on up to sixteen discrete contact closures per card. Up to two of the ten slots 20 are capable of receiving contact output cards for issuing output signals to eight or sixteen discrete alarm/facility contact closures. The contact output cards provide eight contact outputs per card. The contact output cards provide the ability to control contact closures such as switches that control the power to equipment such as air conditioners, heaters, humidifiers, etc. The contact closures can be controlled remotely by an operator at the NOC, or a user can control these relays locally from the front panel LCD display 12 and the control keys 14 on the front of the alarm/facility management unit 10. From the NOC, a user can issue a standard SNMP SET command through the alarm/facility management unit 10 to turn on a fan, for instance. The alarm/facility management unit 10 can automatically determine whether a contact input card or a contact output card has been inserted and can properly communicate with the card. The FIG. 2A embodiment also includes a DB-9P/RS-232 22 port for providing serial communications to an NOC, an RJ-45 connector 24 for a 10Base-T Ethernet connection, an internal modem and two RJ-11 jacks 26 for primary and secondary dial-up connectivity, a fuse holder 28, and a primary power input point 30 for receiving input power.

The rear side of the alarm/facility management unit embodiment shown in FIG. 2B includes sixteen slots 20 which can receive up to six functionally specific cards, up to eight contact input cards, and up to two contact output cards. The contact input cards and the contact output cards can be removed and replaced from the alarm/facility management unit in a power on condition (hot-swapping). As in the alarm/facility management unit embodiment shown in FIG. 2A, up to eight of the sixteen slots 20 are capable of receiving contact input cards that provide real-time status on up to sixteen discrete contact closures per card, and up to two of the sixteen slots 20 are capable of receiving contact output cards for issuing output signals to eight or sixteen discrete alarm/facility contact closures. The contact output cards provide eight contact outputs per card. The contact output cards provide the ability to control contact closures such as switches in the same manner as described above for the embodiment shown in FIG. 2A. The alarm/facility management unit can automatically determine whether a contact input card or a contact output card has been inserted and can properly communicate with the card.

Six of the slots can receive functionally specific cards that are neither contact input cards nor contact output cards. Functionally specific cards include cards for providing serial communications to the NOC, cards for providing serial port communications with external devices, cards for providing an Ethernet connection, cards for providing primary and secondary dial-up connectivity, and a primary power card for receiving input power. One important issue relating to the present invention is the ability to expand the number of serial ports available for communicating with external devices. Serial port cards can provide four or eight serial ports for communications with external devices. These cards provide the alarm/facility management unit with a serial pass through function mode which provides remote access and control of external devices not related to the alarm/facility management unit by the NOC. The alarm/facility management unit embodiments shown in FIGS. 2A and 2B are each scalable for receiving input from 16 to 128 discrete alarm/facility contact closures, and for issuing output signals to eight or sixteen discrete alarm/facility contact closures, and for issuing output signals for eight or sixteen discrete alarm/facility contact closures. However, it should be recognized that the invention is not limited to such configurations. For example, an alarm/facility management unit could be configured to incorporate a minimum of two slots for receiving cards and the alarm/facility management unit internal configuration could be customized with particular functions as described above according to the desires of the user.

Users can configure the alarm/facility management unit 10 inputs to meet the needs of a specific site. If one installation of the alarm/facility management unit 10 requires a mixture of alarm/facility contact input cards or contact output cards, while the other installations do not require the same configuration, the users can build each alarm/facility management unit 10 to meet their needs.

The alarm/facility management unit 10 is equipped with a variety of hardware components. Major known electrical components are mounted within the alarm/facility management unit 10. Such components include a printed circuit board mounted in firm support within the alarm/facility management unit 10. The circuit board carries certain coupling and driver electronics with a microprocessor, Flash or Flash-disk memories and random access memories (RAM). In general, the Flash or Flash-disk memories are used to contain instructions and programs while the RAM memories are employed for operating and working data. Of course, movement and process of instructions as well as data is controlled and accomplished by the microprocessor. The microprocessor is connected to all the keys on the front of the alarm/facility management unit and is variously connected to the other elements of the alarm/facility management unit 10. The memories are connected to the microprocessor through several signal paths. The alarm/facility management unit 10 is powered from an alternating current source and includes a back-up battery for providing power when power from the alternating current source is disrupted.

The alarm/facility management unit 10 takes a variety of alarm/facility inputs, including alarm/facility contact closures (form C, dry contacts), analog inputs, and serial inputs, and converts them to standard SNMP messages which can then be viewed by any SNMP management platform. Users can configure the alarm/facility management unit 10 to monitor up to 128 individual alarm/facility contact closures with one unit. Alarm/facility input types include serial port cards for inputs from external devices that use serial protocols, analog input cards, and pulse based input cards. The alarm/facility management unit 10 also has the ability to remotely or locally correlate activity of more than one alarm/facility contact closure in response to signals received on alarm/facility contact input cards.

The alarm/facility management unit 10 automatically issues a power failure alarm to warn network operators of a potentially critical power failure situation. In the event of a power failure, the alarm/facility management unit 10 immediately switches to back-up battery which provides full functionality, including alarm notification to the NOC. The alarm/facility management unit 10 remains operational for about twenty minutes after primary power failure. The alarm/facility management unit 10 switches back to the main power supply when it comes back.

The alarm/facility management unit 10 also serves the function of monitoring environmental conditions in remote locations, and reporting that information to an NOC. The alarm/facility management unit 10 includes two environmental sensors for continuously monitoring temperature and relative humidity to determine if conditions are within pre-set thresholds. The alarm/facility management unit can monitor high and low warning settings as well as high and low danger settings. Warning and alarm/facility conditions determined by the user are immediately reported to the NOC. The purpose of the warning messages is so that an alarm can be sent to the NOC before maximum and minimum danger thresholds are reached. In addition to the static environmentals, the alarm/facility management unit 10 has the ability to detect the rate of change for any one or both of these environmental measurements. If, for example, the temperature in a remote location rises more quickly than some predetermined criteria, a warning or danger SNMP trap is immediately sent to the NOC for further investigation or for some corrective action to be taken.

The alarm/facility management unit 10 is capable of communicating via three methods to an NOC, depending on the type of configuration that an end user chooses. The alarm/facility management unit 10 includes an RJ-45 connector for a 10Base-T Ethernet connection. The alarm/facility management unit 10 includes an internal modem and two RJ-11 jacks for primary and secondary dial-up connectivity. The alarm/facility management unit 10 also has a DB-9P/RS-232 port for serial communications to an NOC. The types of communication protocols used in the alarm/facility management unit 10 depend on the site WAN/LAN facilities being deployed. For example, the internal alarm/facility management unit modem may not be required for primary communications if the alarm/facility management unit 10 is being deployed at a hub site, where an existing WAN connection via Ethernet is readily available. The alarm/facility management unit 10 supports the following protocols for network management: Simple Network Management Protocol (SNMP); Point-to-Point Protocol (PPP); and Serial Line Interface Protocol (SLIP).

The modem port interface can be used for communications to the NOC in the event the primary Ethernet interface becomes inoperable. The modem interface communicates to the NOC using the SLIP or PPP communications protocols through an RJ-11 jack. The alarm/facility management unit 10 has the ability to switch the modem between a primary and a secondary RJ-11 jack, for primary and back-up dial up connections. The alarm/facility management unit 10 includes two serial ports that are DB-9P interfaces. One is used for configuring the alarm/facility management unit 10 using an external personal computer and the other is used for communicating to the NOC via the SLIP connection. The RS-232 interface can connect with existing WAN infrastructure equipment for a dedicated SLIP connection without requiring the use of the internal modem. In addition, the alarm/facility management unit 10 can be configured with an optional four port serial card to do other serial communications, either to NOC subsystems or with other serial equipment. The alarm/facility management unit 10 can provide up to sixteen relay outputs for the purpose of controlling devices that have electrical control inputs.

The alarm/facility management unit 10 uses a real-time operating system from Vx-Works, a premier real-time UNIX embedded operating system. The Vx-Works operating system polls the network elements and their associated alarms every fifty milliseconds. The end result is quick troubleshooting and problem resolution. The alarm/facility management unit Management Information Base (MIB), or central database that defines the unit and the elements attached to it, is designed to allow for various hardware configurations, based on the needs of the user. The MIB specifies a group of objects, and each object defines a group of data types. MIBs include certain standard MIBs, known as MIB I and MIB II, and nonstandard proprietary MIBs.

The alarm/facility management unit 10 also includes a software configuration tool for configuring the unit 10 and software for automatically upgrading the software in the unit 10. The configuration tool can reside on a laptop of a personal computer of a technician or at a central site by the network manager. Properties for every alarm/facility input, relay output, environmental sensor, communication option, access authority (i.e. who can access the unit's alarm/facility information, and to which NMS platform traps are sent) can be configured, and downloaded to the alarm/facility management unit 10 by connecting two serial ports, one from the personal computer and the other to the alarm/facility management unit 10 and a serial cable. Technicians can also use the configuration tool to upload the most current settings of a unit, modify them on site if need be, and download newer settings. Once a new configuration file has been downloaded to the alarm/facility management unit 10, the unit 10 acknowledges the download by rebooting, as well as saving the previous copy of the MIB as a backup file in memory. The software for automatically upgrading the software in the alarm/facility management unit 10 provides a user with the ability to quickly update all software contained within the alarm/facility management unit 10.

In view of the above description of the structure and form of the disclosed embodiment, a comprehensive understanding thereof may now be best accomplished by describing the software program installed in alarm/facility management unit 10. Through integration with a Hewlett Packard software program named Openview™, the alarm/facility management unit 10 provides powerful reporting and analysis capabilities.

Figure 3:
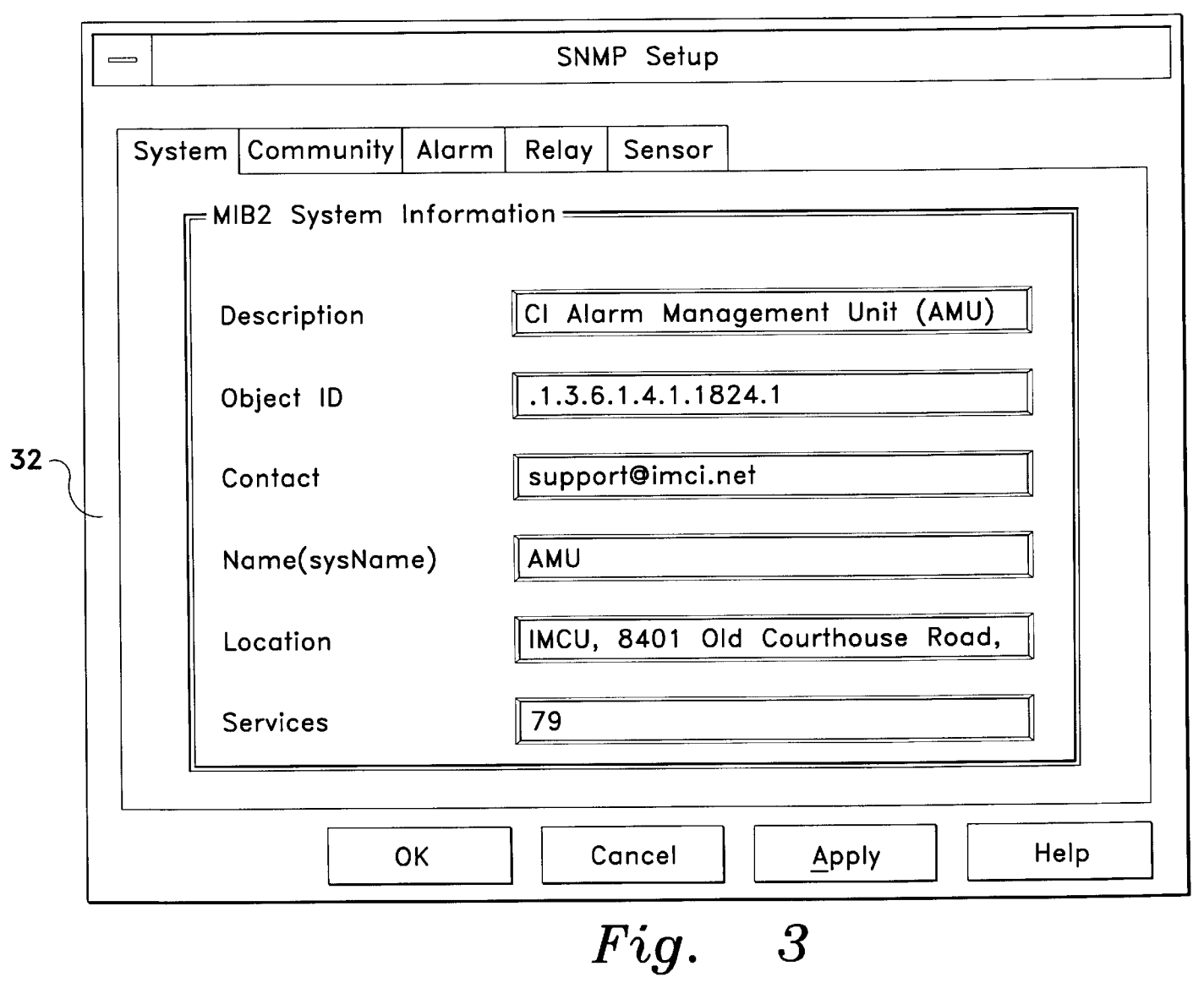
Figure 4:
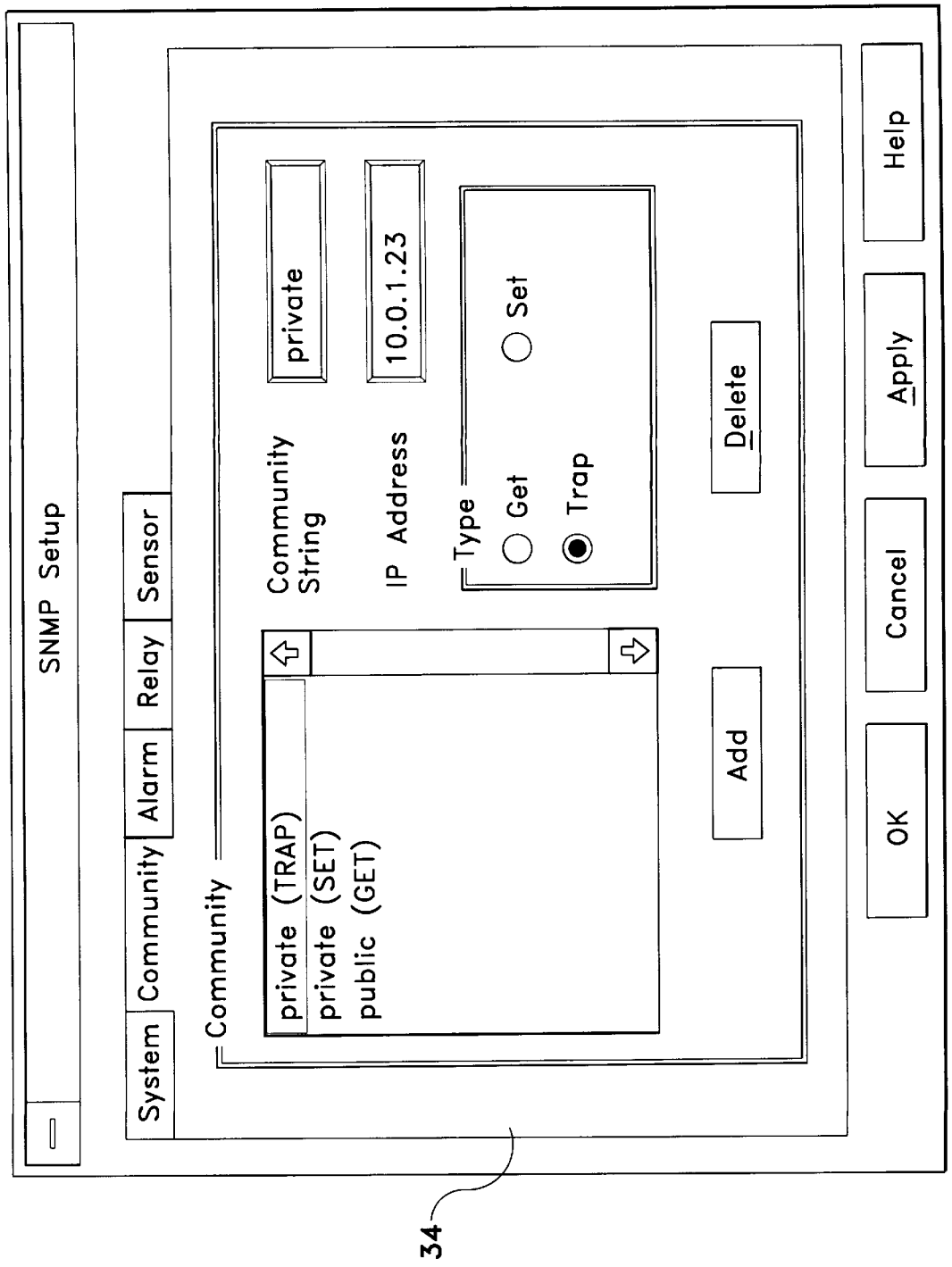
FIG. 4 is the Community menu of the SNMP Setup Screen.

FIG. 3 shows the System menu 32 of the SNMP Setup Screen. This menu enables a user to input standard SNMP information, including a unit's address, contact name and location. FIG. 4 shows the Community menu 34 of the SNMP Setup Screen. This menu 34 enables a user to set SNMP community strings to control which NMS management platforms can access the alarm/facility management unit 10, as well as where traps are sent and which IP addresses have authority to do GETS and SETS (change the configuration). This prevents unauthorized entry to an alarm/facility management unit and the contents of the MIB. Traps can be sent to multiple NMS platforms by simply adding a new community string and "clicking" the trap button. When a trap is sent to the IP address that is specified here, it is sent with the Group name that it has been given, allowing for partitioned alarm views at the NMS in the NOC.

Figure 5:
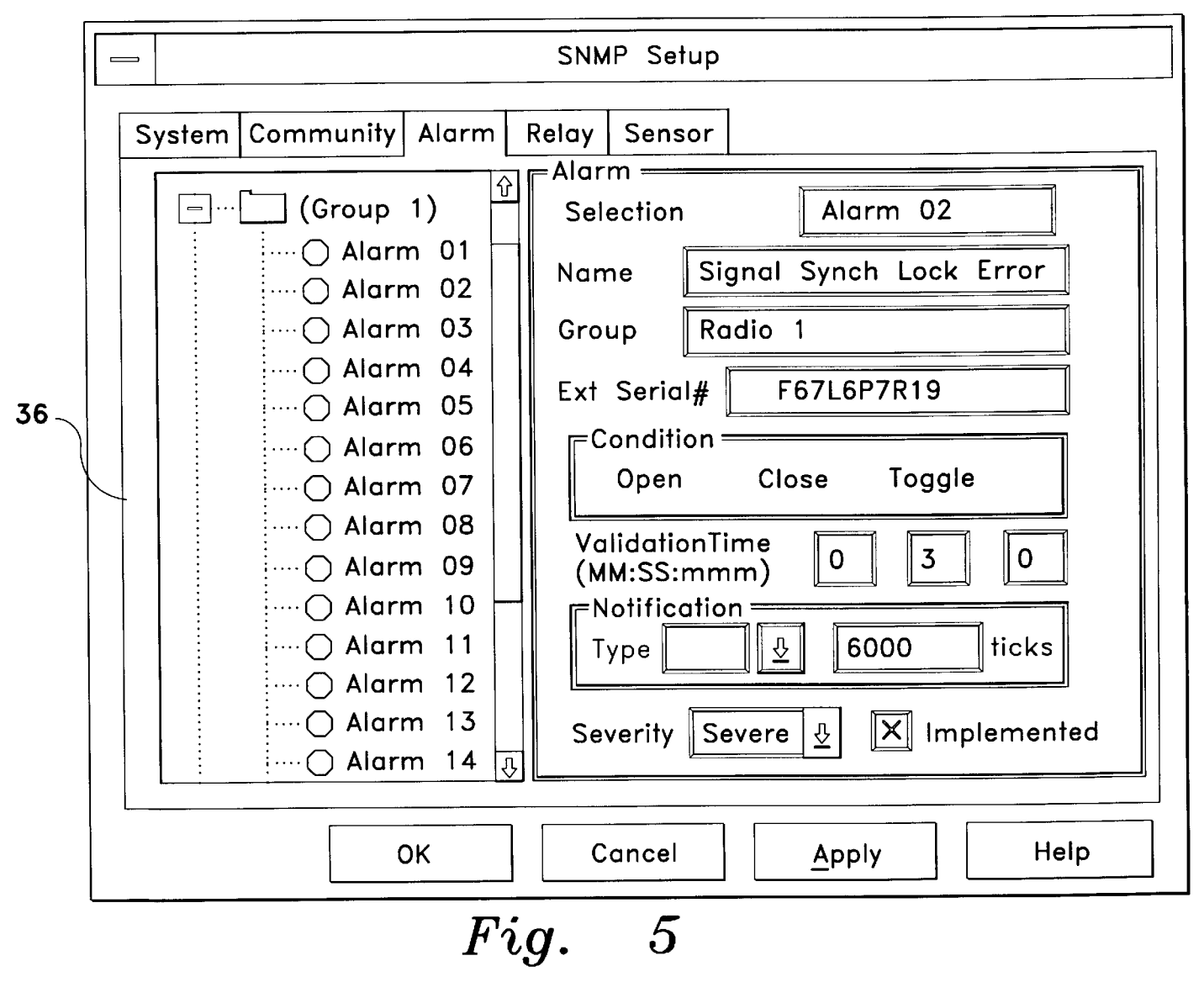

FIG. 5 shows the Alarm menu 36 of the SNMP Setup Screen. This menu enables a user to input data about an alarm/facility contact closure. Input data includes the alarm/facility name, the alarm/facility group, the validation state, the validation time, the notification interval, the alarm/facility severity, and the implementation. The alarm/facility group is used to partition alarm/facility contact closures under one name. For example, group "Radio 1" may be used to name contact closures 1–4 from radio equipment. Group "SONET" may be used to name contact closures 5–8. The validation state enables alarm/facility contact closures to be monitored and causes a trap to be sent in the open, closed or toggle state. The validation time indicates how long an alarm/facility contact closure has to be in a certain state for it to be considered valid. This prevents "noise" type alarms, or erroneous alarms that might be caused by power surges or other unusual circumstances. The notification interval indicates how often, after an alarm/facility contact closure has been validated, that a trap is sent to the NOC. This serves as a filtering mechanism for alarm/facility contact closures, notifying the proper people only when it is necessary. This interval is measured in ticks (1/100th of a second). This field can also be set to send a trap only once, or not at all. The alarm/facility severity allows a user to choose between Minor, Major, and Severe alarm/facility contact closures, with each being represented at the NMS with a different color. The implementation field is used to tell whether an alarm/facility contact closure should be watched by a scanning task. Alarm/facility contact closures can be configured, and not implemented, and as a result, no trap will be sent to the NOC if an alarm occurs. Changing the state of an alarm/facility contact closure to an implemented condition can be done remotely from the NOC.

Figure 6:
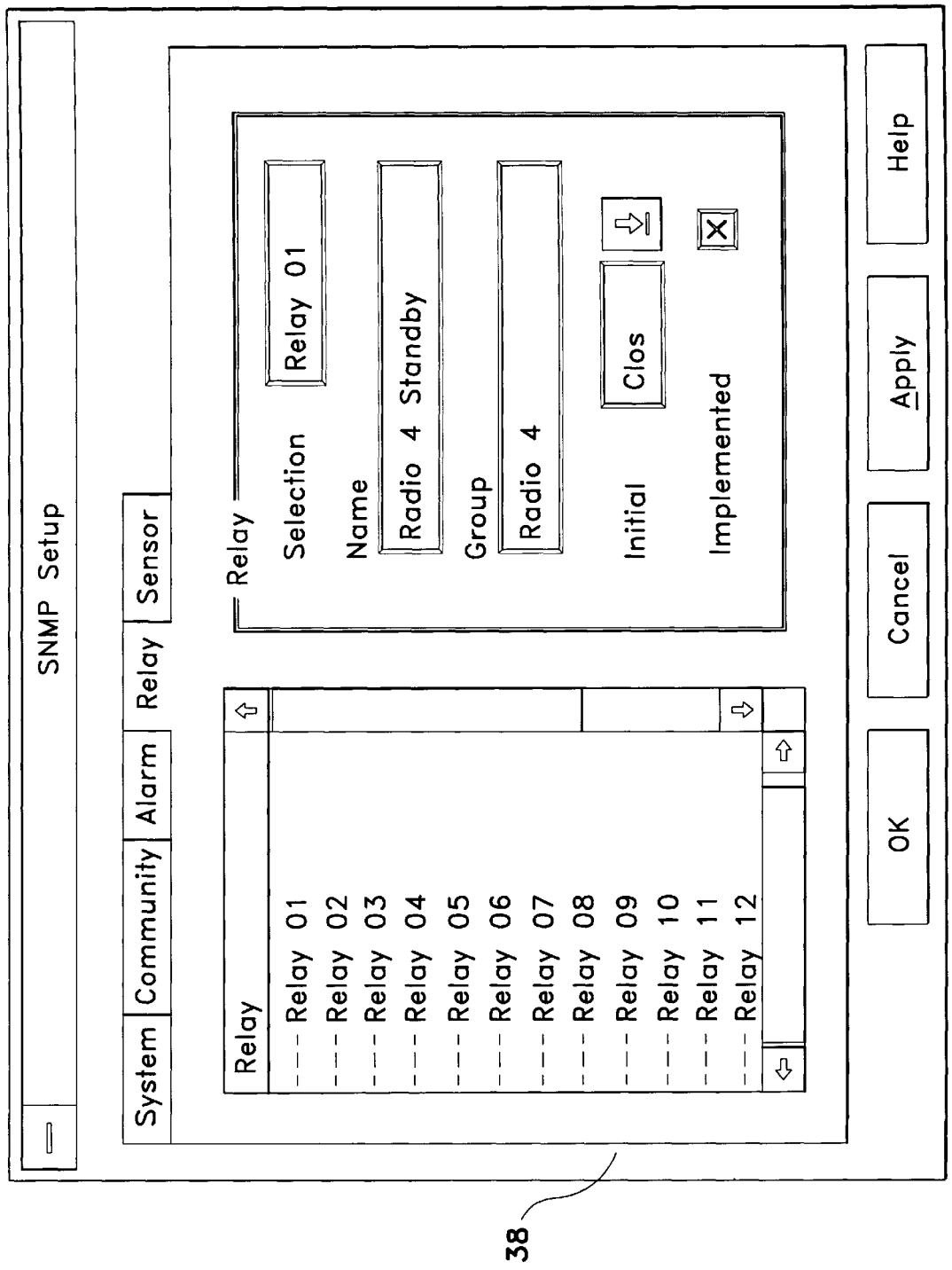
FIG. 6 is the Relay menu on the SNMP Setup screen.

FIG. 6 shows the Relay menu 38 on the SNMP Setup screen. This menu provides a user the ability to input relay data. This data includes the relay name, the relay group, the device associated with the relay, the relay state, and the implementation. The relay group is similar to the alarm/facility group and creates partitions, so that, for example, only certain people can turn on an air conditioner unit or a fan. The relay state can be either "ON" or "OFF". The implementation field indicates whether relay settings are to be implemented. Relays can be configured but not implemented, and turned on later from the NOC.

FIG. 7 shows the Sensor menu 40 of the SNMP Setup screen. This menu provides a user with the ability to configure warning and danger levels for both relative humidity and temperature, and rates of change for each environmental sensor. The notification field indicates how often a signal is sent to the NOC if an alarm has been validated.

Figure 8:
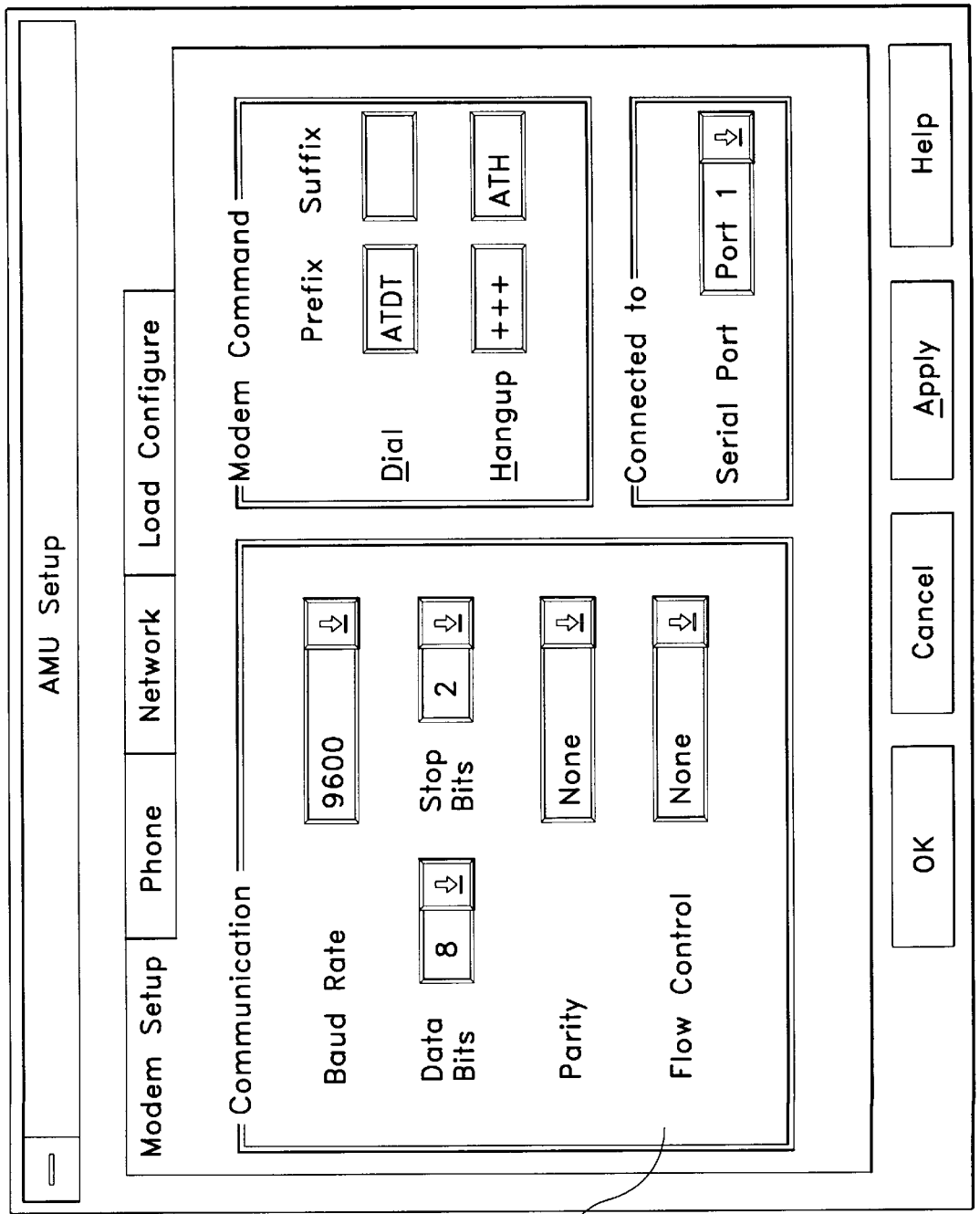
FIG. 8 is the Modem Setup menu of the AMU Setup screen.
Figure 9:
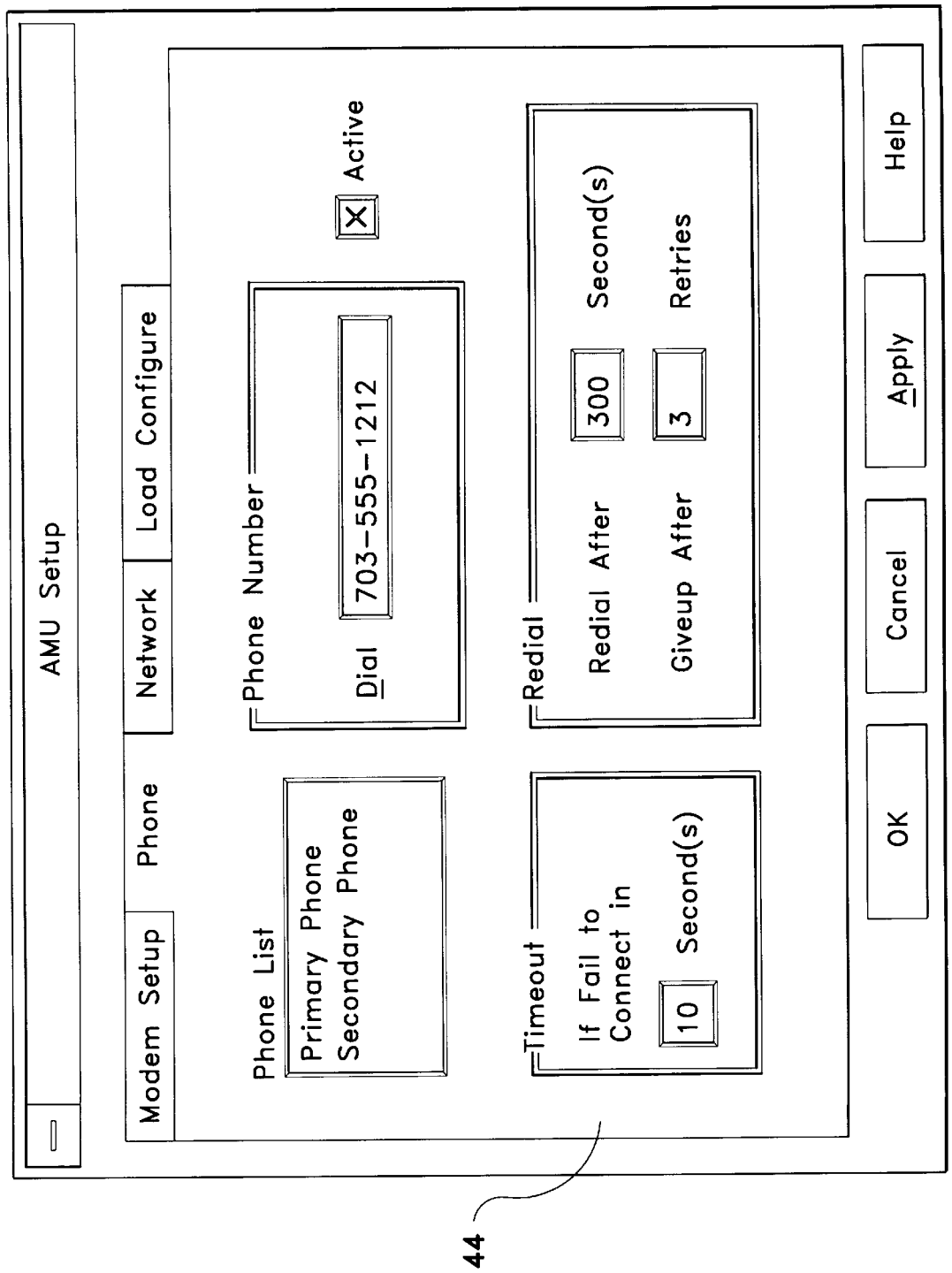
FIG. 9 is the Phone menu of the AMU Setup screen.

FIG. 8 shows the Modem Setup menu 42 of the AMU Setup screen. This menu provides a user with the ability to configure a modem and all of its corresponding settings. FIG. 9 shows the Phone menu 44 of the AMU Setup screen. This menu 14 provides a user with the ability to input primary and secondary telephone numbers, and the number of retries and time-out conditions.

Figure 10:
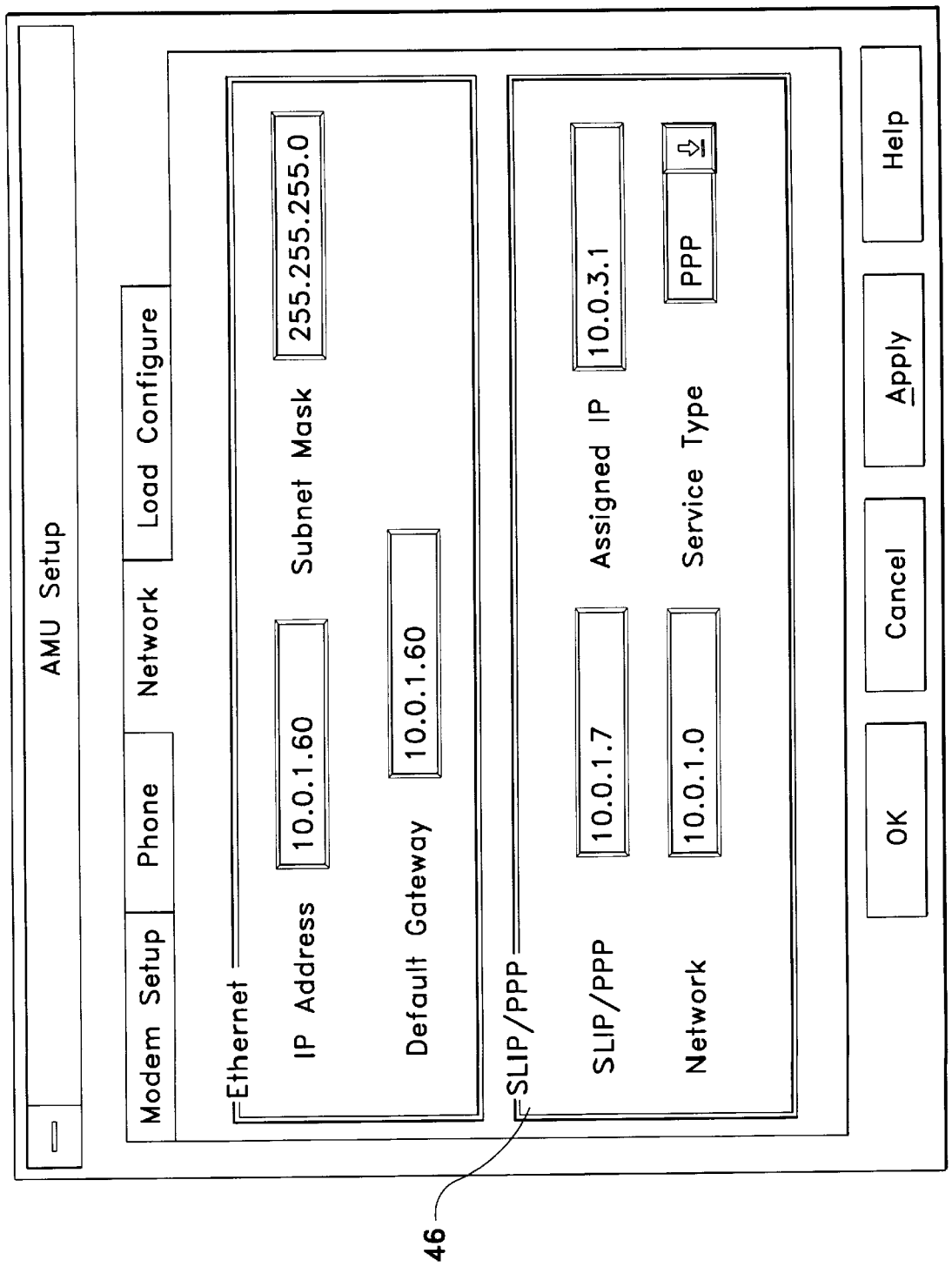
FIG. 10 is the Network menu of the AMU Setup screen.

FIG. 10 shows the Network menu 46 of the AMU Setup screen. This menu provides a user with the ability to establish a node on an IP network and assign a specific IP address. This information can be sent to a sub-network within an enterprise.

Figure 11:
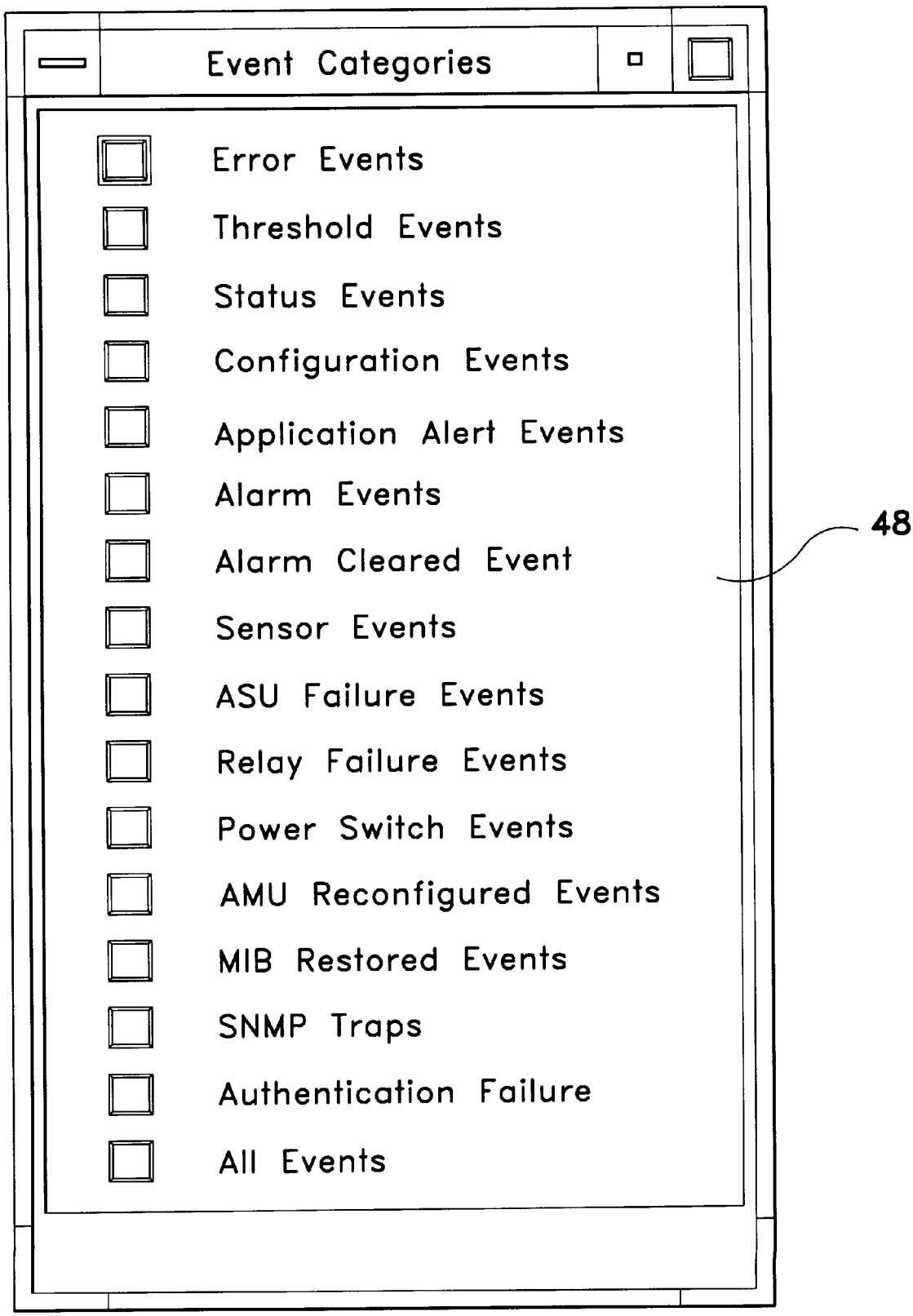
FIG. 11 is the Event Categories menu.
Figure 12:
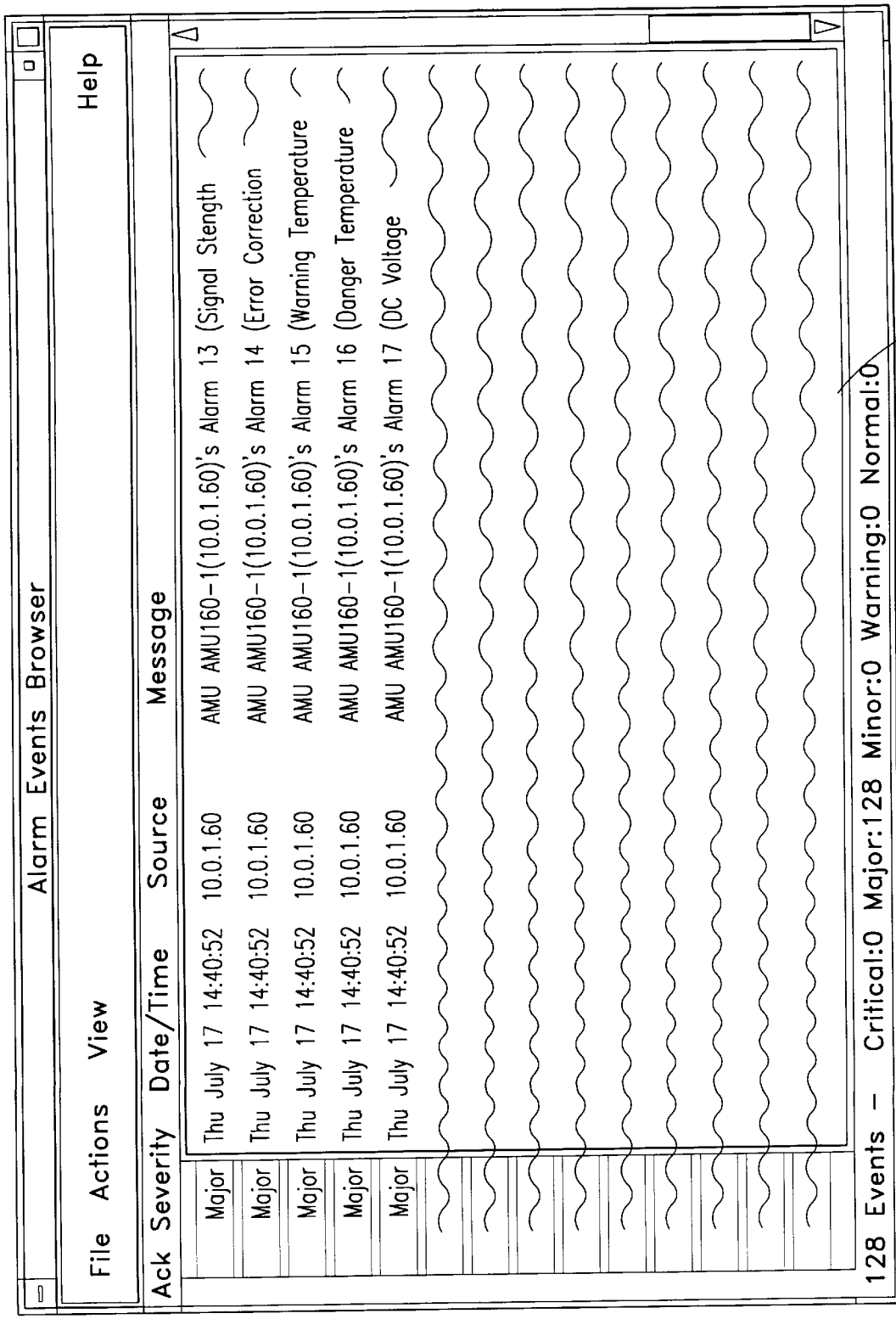
FIG. 12 is the Alarm Events window.

FIG. 11 shows the Event Categories menu 48. This menu 48 is standard in the Hewlett Packard OpenView™ and gives the user a menu of choices enabling the user to view alarms, relays or any one of a variety of standard screens, as well as screens specific to the NMS. The Alarm Events window 50 is shown in FIG. 12. This window provides the user with a scrolling view of alarms, their description, and their severity color.

Figure 13:
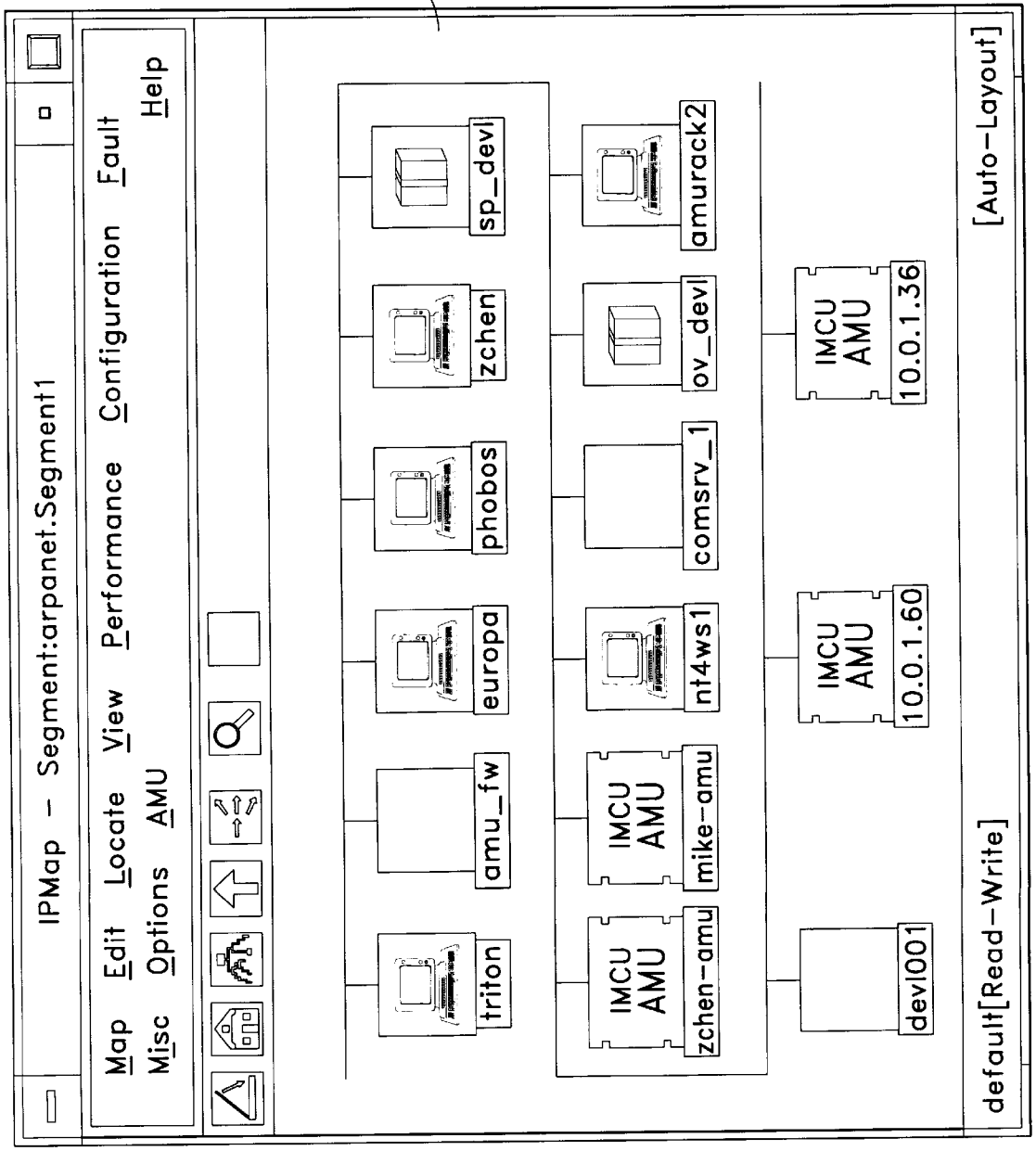
FIG. 13 is an IP segment submap.
Figure 14:
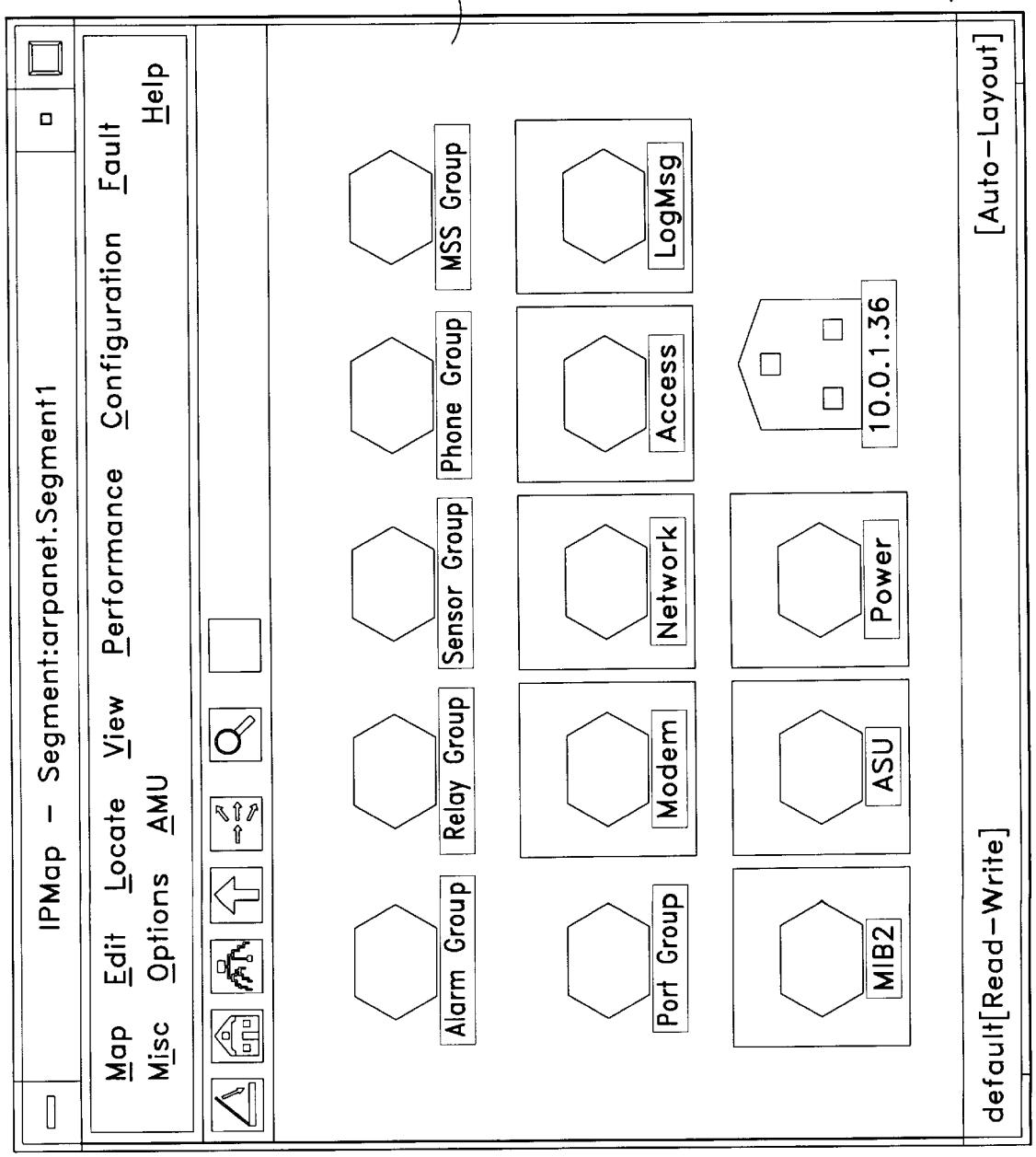
FIG. 14 is a device group submap.

FIG. 13 shows the IP segment submap 52. This screen allows a user to see all of the devices, in the form of icons, that are connected to their NMS platform. Each unit shows up as a node on the network with its own IP address. FIG. 14 shows a device group submap 54 that is accessed by double clicking on an icon in the IP segment submap. This screen allows a user to view all of the alarms, relays, communication and sensor information for a particular device. The user can also configure the serial ports or initiate a software upgrade from this screen.

Figure 15:
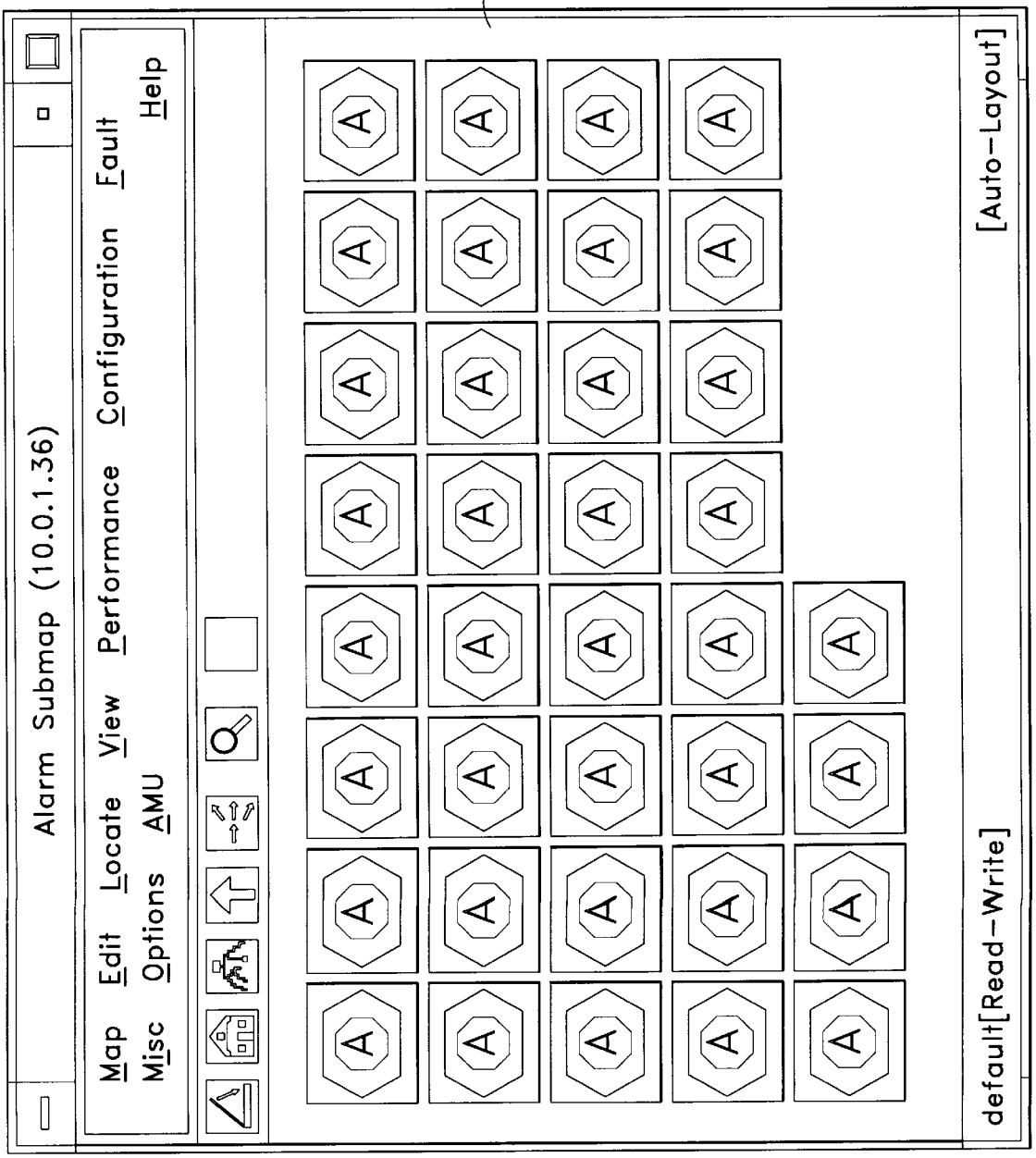
FIG. 15 is an alarm group submap.

FIG. 15 shows an alarm group submap 56 that a user would see if they were to double click the alarm group icon from the previous screen. By doing so, the NMS performs an SNMP "Get" command, and brings up all of the individual alarm information for a particular device. In this example, thirty-six different alarms have been presented to a user. The alarm presentation is highly customizable, and is shown for illustration purposes only.

Figure 16:
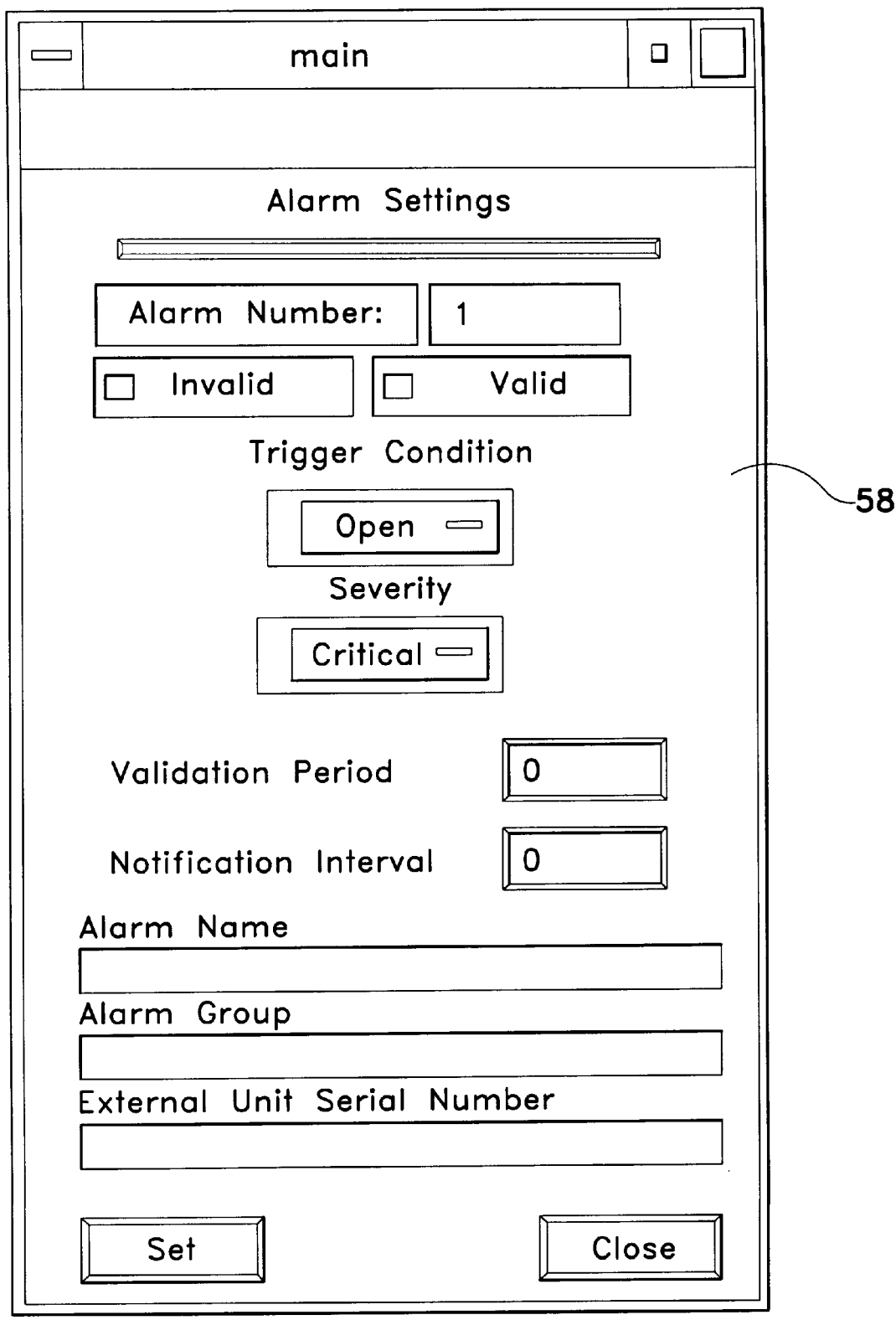
FIG. 16 is an alarm settings screen for a particular alarm.

FIG. 16 shows an alarm settings screen 58 for a particular alarm. If a user selects a specific alarm from the previous screen, this screen is presented. From this screen, an operator can view whether an alarm is in a valid or invalid state, change the trigger conditions, severity, validation interval or notification interval of the alarm. All of these reconfigurations can be done from the NOC.

Figure 17:
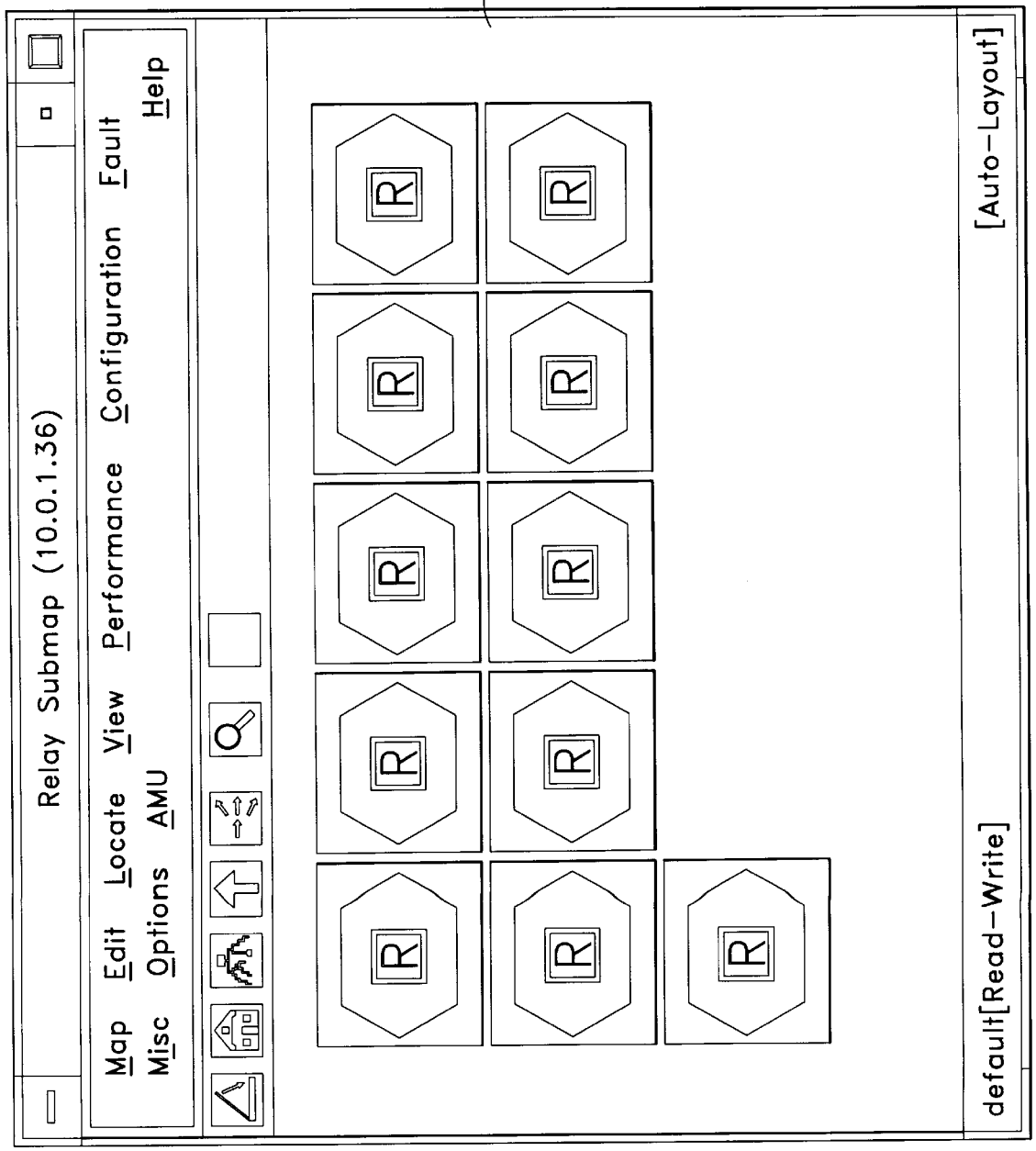
FIG. 17 is the Relay Group Submap.

FIG. 17 shows the Relay Group Submap 60. A user can view details about each relay connected to the device, just as they can with the alarms. If a user double clicks "Relay Group" from the device group sub-map, the NMS performs an SNMP "GET" and retrieves all of the pertinent information for the relays connected to a specific device.

Figure 18:
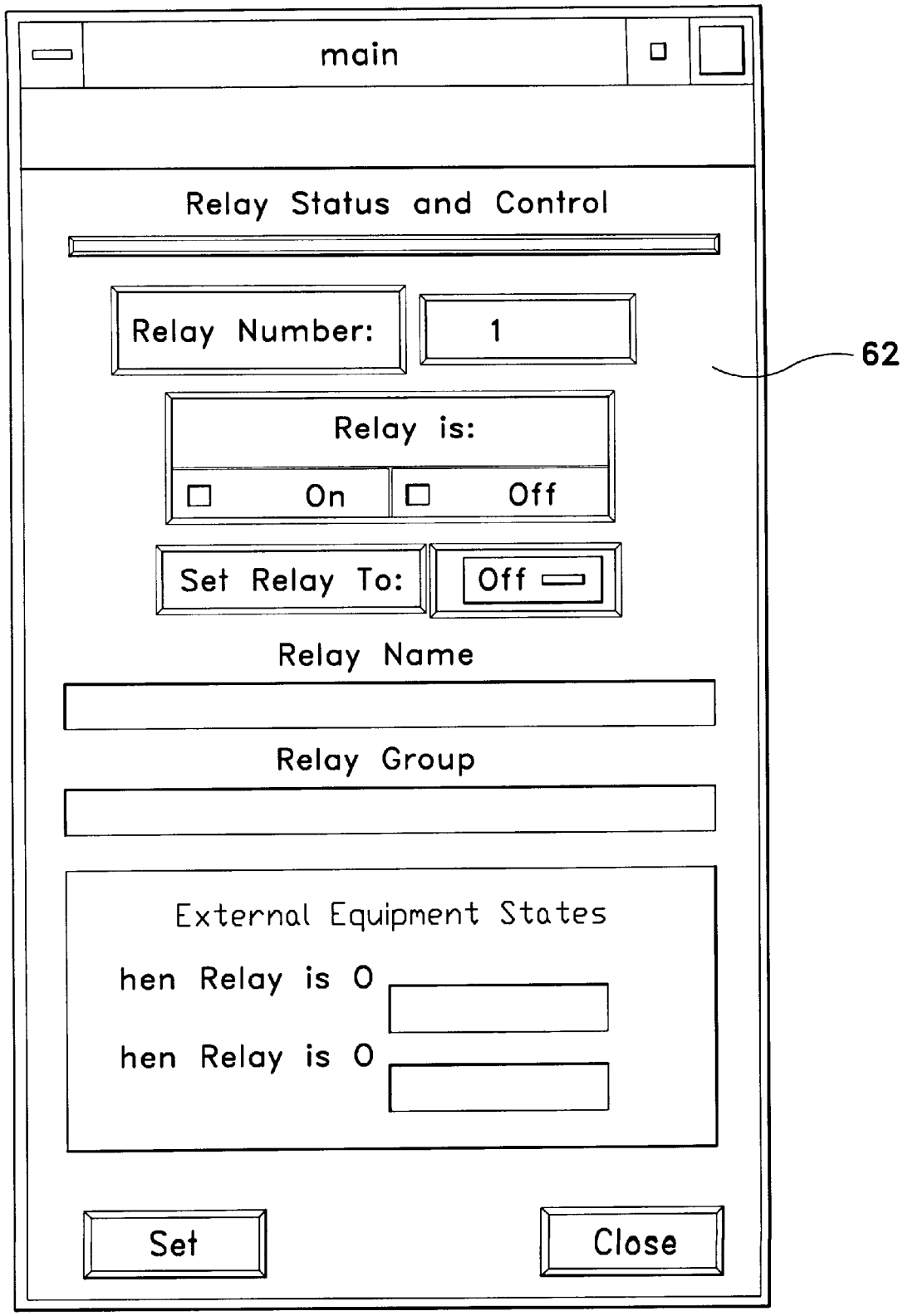
FIG. 18 is a relay settings screen for a particular relay.
Figure 19:
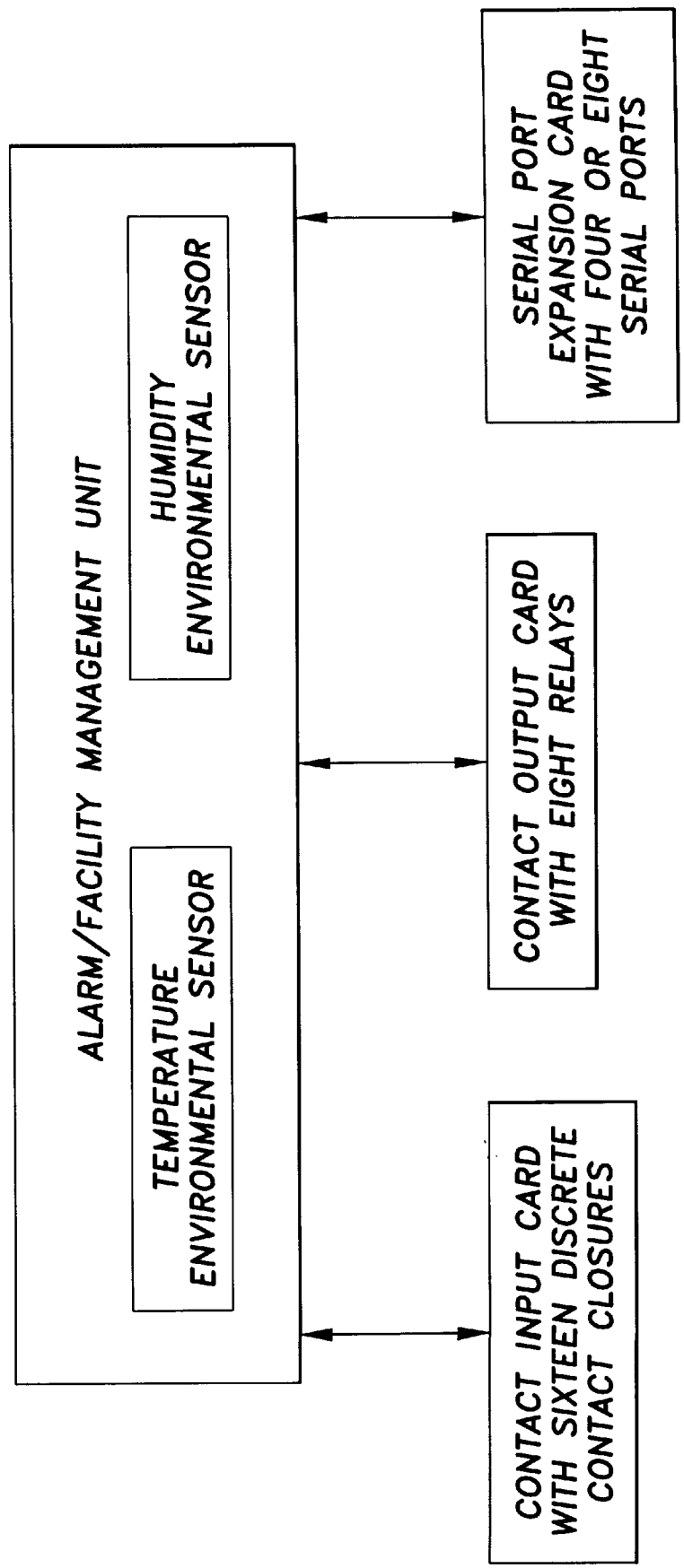
FIG. 19 is a block diagram of an alarm/facility management unit according to the invention.

FIG. 18 shows a relay settings screen 62 for a particular relay. After a user has selected a specific relay from the previous screen, they can view specific details for a particular relay, and even reconfigure the relay to be "On" or "Off". An example would be a user could turn on a fan or an air conditioner from this screen by selecting the drop down box and choosing "On", and then selecting "SET". Once this is done, the NMS issues an SNMP "SET" command to the device, that is passed through the relay outputs to the connected device.

From monitoring to taking corrective actions, the alarm/facility management unit 10 covers all the necessary steps of a complete and efficient network management process; including device monitoring, event capturing, alarm/facility generation, communication to the NOC, interpretation/analysis, and taking action. Its advanced technology, configuration flexibility, and features make the alarm/facility management unit 10 a unique solution that any organization can rely on to improve network visibility and thus maintainability, while reducing the costs of monitoring remote elements. Particular industries that could benefit from the alarm management unit 10 include telecommunications, data management, cable, utilities, and security.

It is to be understood that the present invention is not limited to the embodiments described above, but encompasses any and all embodiments within the scope of the following claims.

We claim:

1. A contact input and contact output management unit comprising:

a housing having a front side and a rear side;

a display on said front side for displaying two lines of up to twenty alphanumeric characters;

four control keys on said front side;

a serial port on said front side enabling communications with a personal computer;

at least two slots in said rear side arranged and configured to receive contact input cards, contact output cards, or serial port expansion cards;

at least one contact input card with sixteen discrete contact closures, at least one contact output card with eight relays, or at least one serial port expansion card with four or eight serial ports;

processing means;

memory means;

a software configuration tool for configuring the contact input and contact output management unit;

a software program configured for providing powerful contact closure and relay reporting and analysis capabilities, and for enabling the automatic upgrade of the software program;

two environmental sensors for monitoring temperature and relative humidity to determine if conditions are within pre-set thresholds; and, means for receiving power.

2. A contact input and contact output management unit according to claim 1, including ten slots or sixteen slots in said rear side arranged and configured to receive contact input cards, contact output cards, or serial port expansion cards.

3. A contact input and contact output management unit according to claim 1, wherein said at least one contact input card or said at least one contact output card are capable of being removed and replaced from said at least two slots in said rear side with the contact input and contact output management unit in a powered condition.

4. A contact input and contact output management unit according to claim 1, including from one to eight contact input cards that provide real-time status on 16 to 128 discrete contact closures, and one or two contact output cards for issuing output signals to eight or sixteen discrete alarm/facility contact closures.

5. A contact input and contact output management unit according to claim 1, including one or two serial port cards which provide the contact input and contact output management unit with a serial pass through function mode which provides remote access and control of external devices not related to the contact input and contact output management unit from a central location.

6. A contact input and contact output management unit according to claim 1, wherein the unit is capable of automatically determining whether a contact input card or a contact output card has been inserted and can properly communicate with the card.

7. A contact input and contact output management unit according to claim 1, wherein the unit has the ability to remotely or locally correlate activity of more than one contact closure in response to signals received on a contact input card.

8. A contact input and contact output management unit according to claim 1, wherein said at least one contact input card with sixteen discrete contact closures or at least one contact output card with eight relays are associated with alarm activity.

9. A contact input and contact output management unit according to claim 1, wherein said at least one contact input card with sixteen discrete contact closures or at least one contact output card with eight relays are associated with facility elements.

10. A contact input and contact output management unit according to claim 1, wherein one or both of said environmental sensors are capable of measuring a rate of change.

11. A contact input and contact output management unit according to claim 1, wherein said software program includes a Simple Network Management Protocol (SNMP) Setup Screen, an Alarm/Facility Management Unit (AMU) Setup Screen, an Individual Alarm/Facility Point (IP) Segment Submap, an Alarm Group Submap, and a Relay Group Submap.

12. A contact input and contact output management unit according to claim 11, wherein said SNMP Setup Screen provides access to a System menu, a Community menu, an Alarm menu, a Relay menu, and a Sensor menu.

13. A contact input and contact output management unit according to claim 12, wherein said System menu enables a user to input an IP address, a contact name and a location.

14. A contact input and contact output management unit according to claim 12, wherein said Community menu enables a user to set community strings to control which management platforms can access the contact input and contact output management unit.

15. A contact input and contact output management unit according to claim 12, wherein said Alarm menu enables a user to input data about an contact input including an alarm name, an alarm group, a validation state, a validation time, a notification interval, an alarm severity, and an implementation.

16. A contact input and contact output management unit according to claim 12, wherein said Relay menu provides a user the ability to input relay data including a relay name, a relay group, a device associated with a relay, a relay state, and an implementation.

17. A contact input and contact output management unit according to claim 12, wherein said Sensor menu provides a user with the ability to configure warning and danger levels for both relative humidity and temperature, and rates of change for each environmental sensor.

18. A contact input and contact output management unit according to claim 11, wherein said AMU Setup Screen provides access to a Modem Setup menu and a Network menu.

19. A contact input and contact output management unit according to claim 18, wherein said Modem Setup menu provides the ability to configure a modem and all of its corresponding settings.

20. A contact input and contact output management unit according to claim 11, wherein said IP Segment Submap provides the ability see all of devices, in the form of icons, that are connected to the contact input and contact output management unit.

* * * * *